(12) United States Patent
Kim et al.

(10) Patent No.: US 8,790,816 B2
(45) Date of Patent: Jul. 29, 2014

(54) RECHARGEABLE BATTERY

(75) Inventors: Duk-Jung Kim, Yongin-si (KR); In Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 123 days.

(21) Appl. No.: 13/401,744

(22) Filed: Feb. 21, 2012

(65) Prior Publication Data

US 2013/0071709 A1   Mar. 21, 2013

(30) Foreign Application Priority Data

Sep. 19, 2011   (KR) .......................... 10-2011-0094116

(51) Int. Cl.
*H01M 2/20* (2006.01)

(52) U.S. Cl.
USPC ................. 429/161; 429/53; 429/54; 429/56; 429/58; 429/59; 429/61; 429/82; 429/163; 429/178; 429/179; 429/185; 429/211; 429/174; 429/7

(58) Field of Classification Search
CPC ..... H01M 2/06; H01M 2/345; H01M 10/052; H01M 10/0436; H01M 2/30; Y02E 60/12
USPC .......................................... 429/1–11, 47–255
See application file for complete search history.

(56) References Cited

U.S. PATENT DOCUMENTS

| 2005/0208345 | A1* | 9/2005 | Yoon et al. ........................ 429/7 |
| 2006/0099501 | A1 | 5/2006 | Kim et al. |
| 2010/0143789 | A1* | 6/2010 | Kim .............................. 429/163 |
| 2011/0039136 | A1* | 2/2011 | Byun et al. ...................... 429/56 |

FOREIGN PATENT DOCUMENTS

| KR | 10-2006-0037839 A | 5/2006 |
| KR | 10-2006-0067253 A | 6/2006 |

* cited by examiner

*Primary Examiner* — Mark F Huff
*Assistant Examiner* — Omar Kekia
(74) *Attorney, Agent, or Firm* — Christie, Parker & Hale, LLP (57) ABSTRACT

A rechargeable battery including an electrode assembly having a first electrode and a second electrode; a case housing the electrode assembly; a cap plate coupled to the case; a terminal electrically connected to the electrode assembly and protruding from the cap plate; a connecting member on the cap plate, the connecting member including a body, a first short-circuit tab within the body and electrically connected to the first electrode, and a second short-circuit tab within the body and electrically connected to the second electrode; and a short-circuit member spaced from the first short-circuit tab and the second short-circuit tab.

13 Claims, 6 Drawing Sheets

RECHARGEABLE BATTERY

CROSS-REFERENCE TO RELATED APPLICATION

This application claims priority to and the benefit of Korean Patent Application No. 10-2011-0094116 filed in the Korean Intellectual Property Office on Sep. 19, 2011, the entire content of which is incorporated herein by reference.

BACKGROUND

1. Field

The described technology relates generally to a rechargeable battery.

2. Description of Related Art

A rechargeable battery can be repeatedly charged and discharged, unlike a primary battery which can typically only be charged once. A low capacity rechargeable battery has been used for small electronic devices such as a mobile phone, a laptop computer, and a camcorder, and a large capacity battery has been used as a power source for driving a motor of a hybrid vehicle.

Recently, a high-output rechargeable battery using a non-aqueous electrolyte with high energy density has been developed, and a plurality of high-output rechargeable batteries can be connected in series to constitute a large-capacity battery module so as to be used for driving a motor of a device, e.g., an electric automobile or the like, that requires much power.

Further, a single large-capacity rechargeable battery generally includes a plurality of rechargeable batteries connected in series, and such rechargeable batteries may have a cylindrical shape, an angular shape, or the like.

When an abnormal reaction occurs to increase the pressure in a rechargeable battery having a metallic case, there is a risk that the rechargeable battery rechargeable battery may ignite or explode.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a safety-improved rechargeable battery.

In one embodiment, a rechargeable battery is provided including an electrode assembly comprising a first electrode and a second electrode; a case housing the electrode assembly; a cap plate coupled to the case; a terminal electrically connected to the electrode assembly and protruding from the cap plate; a connecting member on the cap plate, the connecting member including a body, a first short-circuit tab within the body and electrically connected to the first electrode, and a second short-circuit tab within the body and electrically connected to the second electrode; and a short-circuit member spaced from the first short-circuit tab and the second short-circuit tab.

In one embodiment, wherein the short-circuit member is configured to electrically connect the first short-circuit tab and the second short-circuit tab when an internal pressure of the rechargeable battery increases to a predetermined pressure. Further, the short-circuit member may be within a short-circuit groove formed in the cap plate, wherein the short-circuit member has an edge and a curved portion extending generally toward the electrode assembly from the edge. Additionally, the body may be a plate and includes an opening configured to be generally aligned with a vent member.

In one embodiment, the body has a first groove exposing a surface of the first short-circuit tab and an opening into which the terminal is accommodated. Additionally, in one embodiment, the body has a short-circuit groove, wherein a first short-circuit unit in the short-circuit groove is on the first short-circuit tab, wherein a second short-circuit unit in the short-circuit groove is on the second short-circuit tab, and wherein the first short-circuit unit and the second short-circuit unit are separate from each other. A protrusion extending toward the cap plate may be formed in the short-circuit groove, and a groove into which the protrusion is accommodate is formed on the cap plate.

In one embodiment, the body has a groove into which the first short-circuit tab and the second short-circuit tab are accommodated, and wherein a cover plate covers the first short-circuit tab and the second short-circuit tab. Further, in one embodiment the first short-circuit tab includes a terminal connector having an opening into which a first terminal of the terminal is accommodated, a first short-circuit unit that is exposed to the body, and a lead connecting the terminal connector and the first short-circuit unit, and wherein the second short-circuit tab includes a terminal connector having an opening into which a second terminal of the terminal is accommodated, a second short-circuit unit that is exposed to the body, and a lead connecting the terminal connector and the second short-circuit unit. An insulating bar may be between the first short-circuit unit and the second short-circuit unit and the connecting member may have an area corresponding to an area of the cap plate.

According to an embodiment, the first short-circuit tab and the second short-circuit tab are inserted into the connecting member so it is easy to install the short-circuit tabs and prevent the case from being oxidized by maintaining the case in an electrically neutral state.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Like reference numerals designate like elements throughout the specification.

Figure 1:
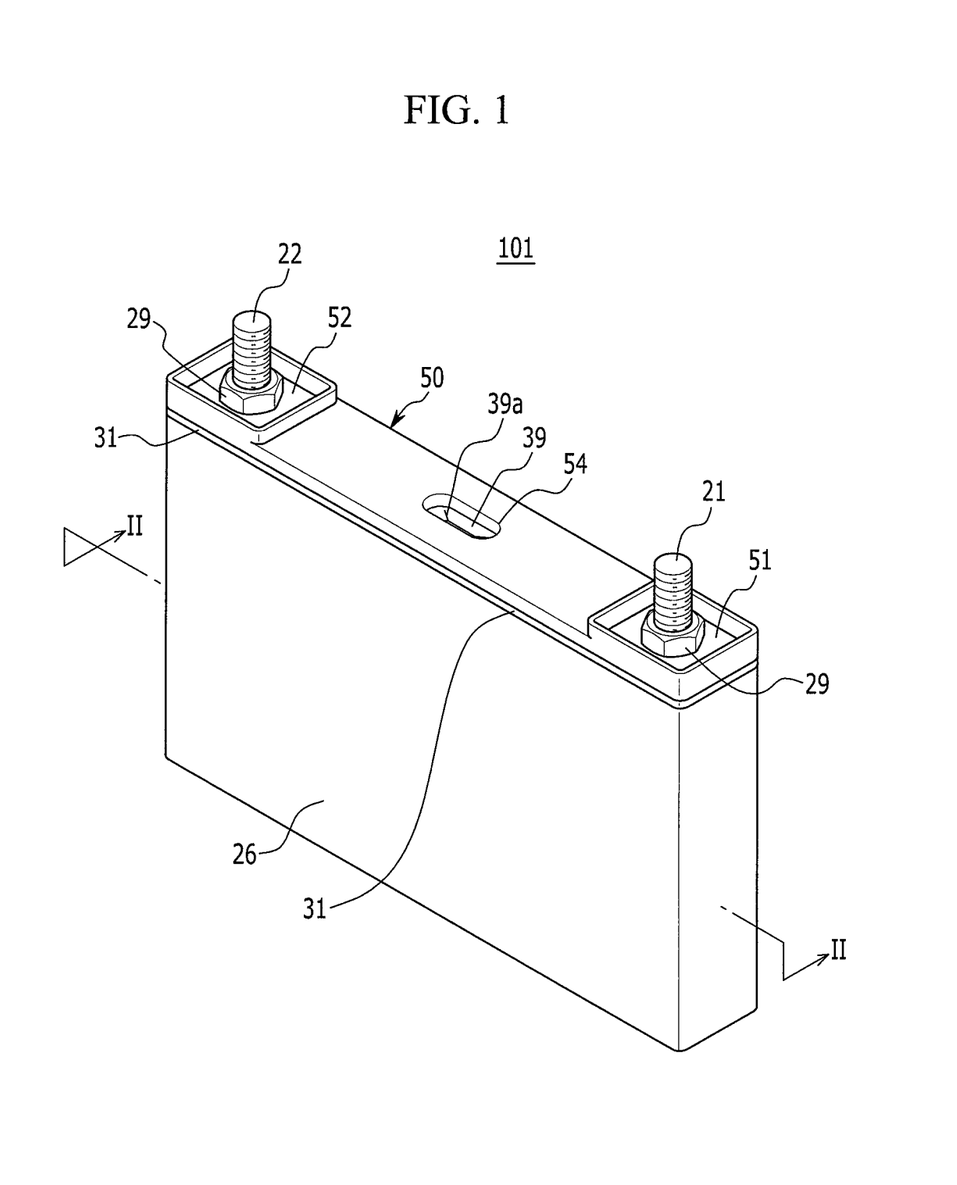
FIG. 1 shows a perspective view of a rechargeable battery according to a first exemplary embodiment of the present invention.
Figure 2:
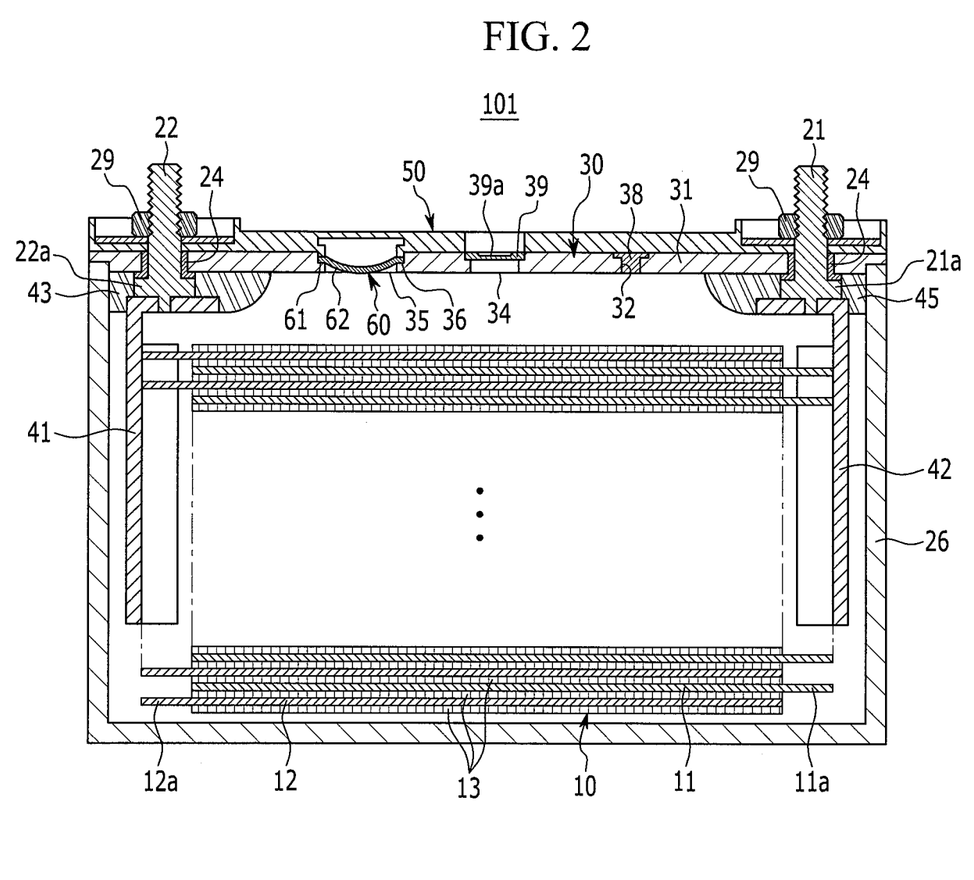
FIG. 2 shows a cross-sectional view with respect to a line II-II of FIG. 1.

FIG. 1 shows a perspective view of a rechargeable battery according to a first exemplary embodiment of the present invention, and FIG. 2 shows a cross-sectional view with respect to a line II-II of FIG. 1.

Referring to FIG. 1 and FIG. 2, the rechargeable battery 101 includes an electrode assembly 10 that is wound while providing a separator 13 between a positive electrode 11 and a negative electrode 12, a case 26 receiving the electrode assembly 10, and a cap assembly 30 combined with an opening of the case 26.

The rechargeable battery 101 according to the first exemplary embodiment is exemplarily described as a lithium ion secondary battery formed in the shape of a prism. However, the present invention is not limited thereof, and the present invention may be applied to various types of batteries such as a lithium polymer battery or a cylindrical battery.

The positive electrode 11 and the negative electrode 12 include coated regions where an active material is coated to a current collector formed of a thin metal foil and uncoated regions 11a and 12a where the active material is not coated. The positive electrode uncoated region 11a is formed at a first side of the positive electrode 11 along a length direction of the positive electrode 11, and the negative uncoated region 12a is formed at a second side of the negative electrode 12 along a length direction of the negative electrode 12. The positive electrode 11 and the negative electrode 12 are spirally wound, with the separator 13 located therebetween. In one embodiment, the separator 13 is an insulator.

However, the present invention is not limited thereto, and the electrode assembly 10 may have a structure wherein a positive electrode and a negative electrode each formed of a plurality of sheets are alternately layered with a separator located therebetween.

The case 26 is shaped as a substantially rectangular parallelepiped, and has an opening at one side thereof. The case 26 is made of, for example, a metal such as aluminum or stainless steel.

The cap assembly 30 includes a cap plate 31 for covering an opening of the case 26, a first terminal 21 protruded outside the cap plate 31 and electrically connected to the positive electrode 11, and a second terminal 22 protruded outside the cap plate 31 and electrically connected to the negative electrode 12.

The cap plate 31 is formed as a thin plate extended in one direction and is coupled to the opening of the case 26. A seal stopper 38 is installed in an electrolyte injection opening 32 of the cap plate 31, and a vent plate 39 having a notch 39a adapted to fracture at a threshold pressure is installed in a vent opening.

Also, a short-circuit opening 35 is formed in the cap plate 31, and a short-circuit member 60 that is transformed or activated by an internal pressure of the rechargeable battery 101 and electrically connecting the positive electrode 11 and the negative electrode 21 is installed in the short-circuit opening 35.

The short-circuit member 60 is formed to be a circular plate, and it includes an edge 61 and a curved portion 62 formed inside the edge 61 and curved in a downward direction as an arc. The edge 61 is inserted into a groove 36 formed in the cap plate 31. A part of the short-circuit member 60 that is curved downward is protruded upward to electrically connect a first short-circuit tab 51 and a second short-circuit tab 52 when the internal pressure of the rechargeable battery is increased.

The first terminal 21 and the second terminal 22 are installed to protrude from the cap plate 31. The first terminal 21 is electrically connected to the positive electrode 11 with a current collecting member 42 as a medium, and the second terminal 22 is electrically connected to the negative electrode 12 with a current collecting member 41 as a medium. However, the present invention is not restricted thereto, and the first terminal 21 can be electrically connected to the negative electrode and the second terminal 22 can be electrically connected to the positive electrode.

The first terminal 21 is formed to be a column, and a gasket 24 for sealing and insulation is formed between the first terminal 21 and the cap plate 31. A terminal flange 21a is formed below the first terminal 21, and the terminal flange 21a is fixed by welding to the current collecting member 42 that contacts the electrode assembly 10. In addition, a bottom insulating member 43 for inserting the terminal flange 21a and current collecting member 41 is installed on the bottom of the cap plate 31.

The second terminal 22 is formed to be a column in a like manner of the first terminal 21, and a gasket 24 for sealing and insulation is installed between the second terminal 22 and the cap plate 31. A terminal flange 22a is formed below the second terminal 22, and the terminal flange 22a is fixed by welding to the current collecting member 42. A bottom insulating member 45 for inserting the terminal flange 22a and the current collecting member 41 is installed on the bottom of the cap plate 31.

A connecting member 50 is installed on the cap plate 31 such that the first terminal 21 and the second terminal 22 are fastened by nuts 29 when the connecting member 50 is installed.

Figure 3:
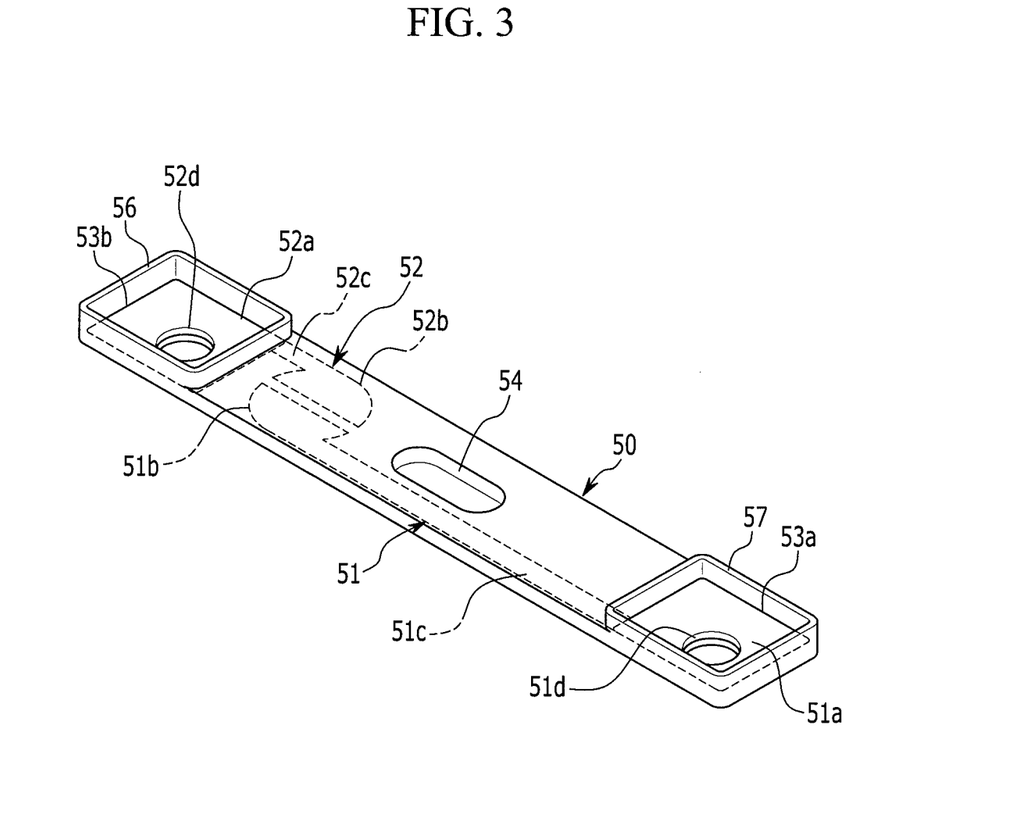
FIG. 3 shows a perspective top view of a connecting member of a rechargeable battery according to the first exemplary embodiment of the present invention.
Figure 4:
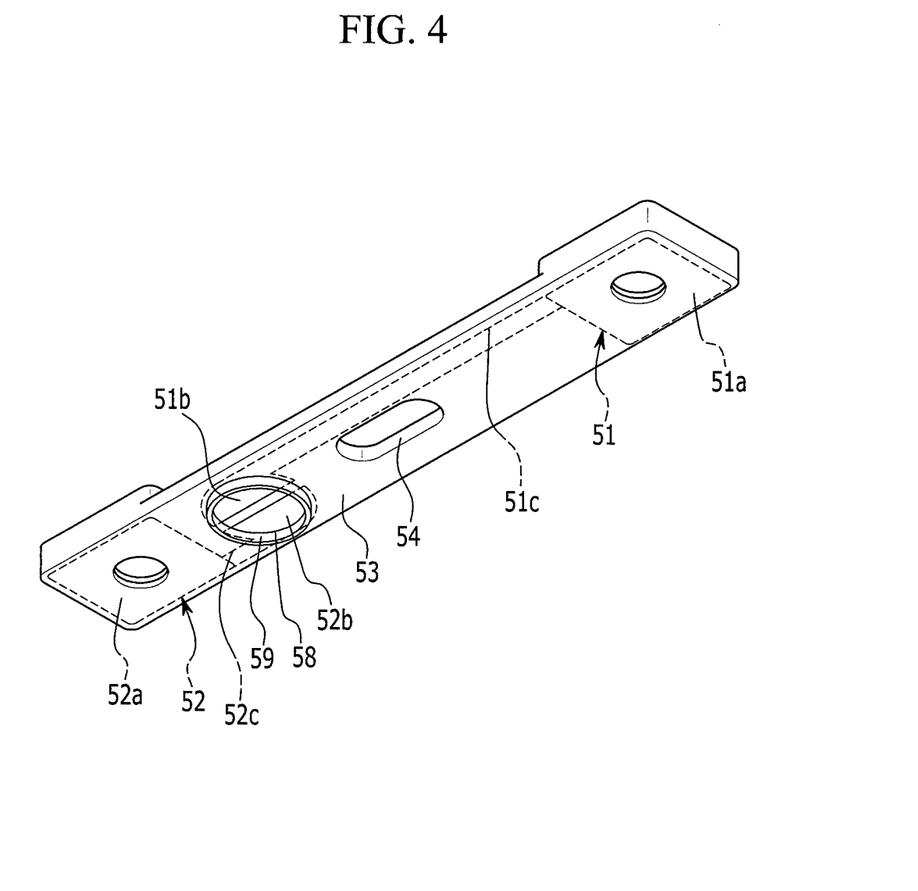
FIG. 4 shows a perspective bottom view of a connecting member of a rechargeable battery according to the first exemplary embodiment of the present invention from the bottom.

As shown in FIG. 3 and FIG. 4, the connecting member 50 includes a body 53 formed in a square or rectangular plate shape having an area generally corresponding to the area of the cap plate 31, the first short-circuit tab 51 inserted into the body 53 and electrically connected to the first terminal 21, and the second short-circuit tab 52 inserted into the body 53 and electrically connected to the second terminal 22.

The body 53 is made of an insulating material, and it includes an opening 54 adjacent to a top part of the vent plate 39 to provide a gas discharge path when the vent member 39 is opened.

The body 53 can be formed through inserting and molding so that the first short-circuit tab 51 and the second short-circuit tab 52 can be inserted into and installed within the body 53.

A first groove 53a is formed on a first edge of the body 53, and a second groove 53b is formed on a second edge thereof. A guide protrusion 57 is formed around the first groove 53a and protrudes in a first direction, and an opening into which the first terminal 21 is inserted is formed in the center thereof. A guide protrusion 56 protrudes in the first direction around the second groove 53b, and an opening in which the first terminal 21 is inserted is formed.

A short-circuit groove 58 that is opened toward the cap plate 31 is formed on the bottom of the body 53, and a protrusion 59 extending downward towards the cap plate is formed near the short-circuit groove 58. The short-circuit groove 58 is located above the short-circuit member 60, and the protrusion 59 is inserted into the groove 36 formed in the cap plate 31 to contact the edge 61 of the short-circuit member 60.

The first short-circuit tab 51 includes a terminal connector 51a within the first groove 53a, a first short-circuit unit 51b inserted into the short-circuit groove 58, and a lead 51c for connecting the terminal connector 51a and the first short-circuit unit 51b.

The terminal connector 51a is formed as a plate, and it is inserted into the first groove 53a such that its top surface is exposed to the outside. An opening 51d into which the first terminal 21 is inserted in is formed on the terminal connector 51a and the connecting member 50 is electrically connected the first terminal 21 with the nut 29 on the first terminal. The first short-circuit unit 51b is formed to be generally semicircular, and it is inserted into the short-circuit groove 58 and exposed from underneath. The lead 51c is formed as a bar wherein a first end thereof is connected to the terminal connector 51a, and a second end thereof is connected to the first short-circuit unit 51b.

The second short-circuit tab 52 includes a terminal connector 52a within the second groove 53b, a second short-circuit unit 52b inserted into the short-circuit groove 58, and a lead 52c for connecting the terminal connector 52a and the first short-circuit unit 52b.

The terminal connector 52a is formed as a plate, and it is inserted into the second groove 53b such that its top surface is exposed to the outside. An opening 52d into which the second terminal 22 is inserted is formed in the terminal connector 52a, and it is electrically connected to the second terminal 22 with a nut 29 that is installed on the second terminal. The second short-circuit unit 52b is formed to be generally semicircular, and it is inserted into the short-circuit groove 58 such that its bottom surface is exposed. Further, the lead 52c is formed to be a rod, wherein a first end thereof is connected to the terminal connector 52a and a second end thereof is connected to the first short-circuit unit 52b.

The first short-circuit unit 51b and the second short-circuit unit 52b are spaced from each other, and are electrically connected with each other by the short-circuit member 60 when the short-circuit member 60 is transformed or activated.

When a connecting member 50 is installed on the cap plate 31 as described with respect to the present exemplary embodiment, the case 26 and the cap plate 31 can be maintained in a neutral state. Accordingly, the case 26 and the cap plate 31 are prevented from being charged by the positive electrode or negative electrode and thereby prevented from being oxidized.

Further, the short-circuit tabs 51 and 52 can be respectively electrically connected to the terminals 21 and 22 by the nuts 29 so it is easy to electrically connect the terminals 21 and 22 and the connecting member 50.

Figure 5:
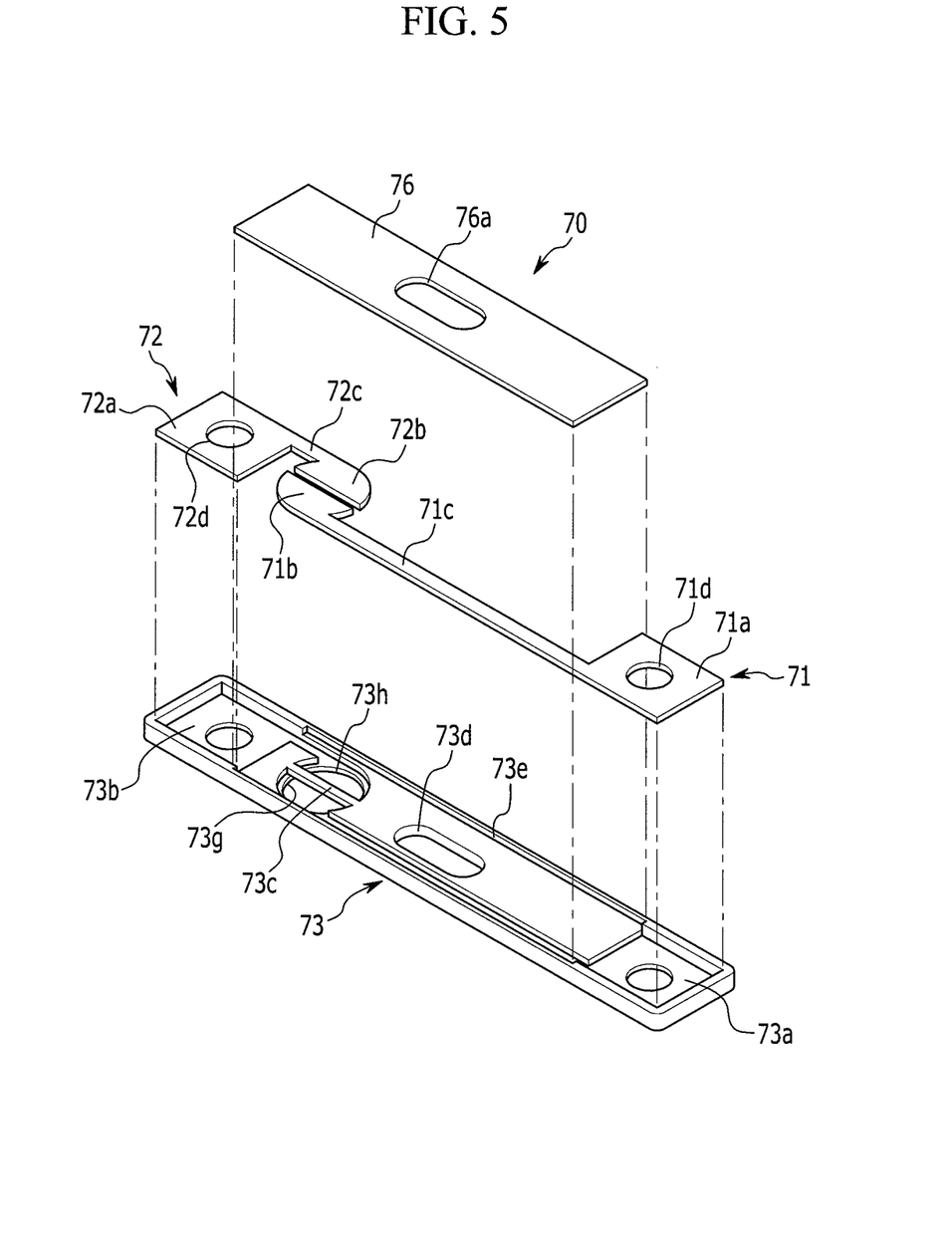
FIG. 5 shows an exploded top perspective view of a connecting member of a rechargeable battery according to a second exemplary embodiment of the present invention.
Figure 6:
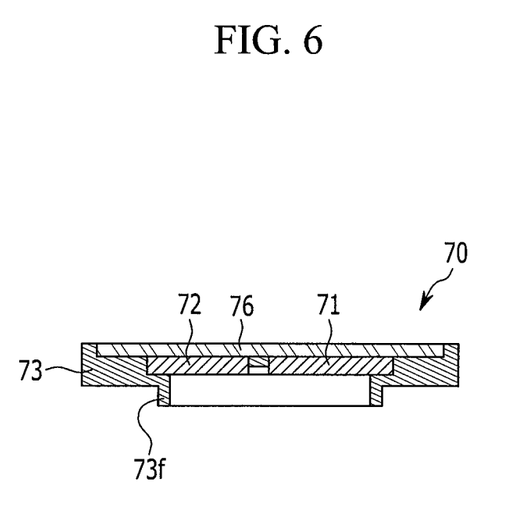
FIG. 6 shows a cross-sectional view of the connecting member of FIG. 5.

FIG. 5 shows an exploded perspective view of a connecting member according to a second exemplary embodiment of the present invention, and FIG. 6 shows a cross-sectional view when members shown in FIG. 5 are combined.

The rechargeable battery has an equivalent configuration to the rechargeable battery according to the first exemplary embodiment except for the configuration of the connecting member 50, so no repeated description will be provided.

Referring to FIG. 5 and FIG. 6, a connecting member 70 includes a body 73, a first short-circuit tab 71 and a second short-circuit tab 72 inserted into the body 73, and a cover plate 76 adjacent to the short-circuit tabs 71 and 72.

The body 73 is formed to be a plate, and a first groove 73a into which the first short-circuit tab 71 is inserted and a second groove 73b into which the second short-circuit tab 72 is inserted are formed on the top surface. Also, an opening 73d provided on the top of the vent plate 39 is formed in the center of the body 73.

An opening into which the first terminal 21 is inserted is formed on an edge of a first side in a length direction of the body 73, and an opening into which the second terminal 22 is inserted is formed on an edge of a second side thereof.

A short-circuit opening 73g that is opened downward is formed in the first groove 73a, and a short-circuit opening 73h that is opened downward is formed in the second groove 73b. An insulating bar 73c for separating a gap between the short-circuit tabs is formed between the short-circuit opening 73g and the short-circuit opening 73h.

Also, a groove 73e into which the cover plate 76 is inserted is formed on the top surface of the body 73.

The first short-circuit tab 71 includes a terminal connector 71a in which an opening 71d into which the first terminal 21 is inserted is formed, a first short-circuit unit 71b provided on the top of the short-circuit opening 73g, and a lead 71c for connecting the terminal connector 71a and the first short-circuit unit 71b.

The terminal connector 71a is formed to be a square plate, and it is inserted into the first groove 73a such that its top surface is exposed to the outside. The opening 71d into which the first terminal 21 is inserted is formed on the terminal connector 71a, and it is electrically connected to the first terminal 21 with the nut 29 as a medium. The first short-circuit unit 71b is generally semicircular, and it is adjacent to the short-circuit opening 73g and is exposed downward.

The second short-circuit tab 72 includes a terminal connector 72a in which an opening 72d into which the first terminal 22 is inserted is formed, a second short-circuit unit 72b provided on the top of the short-circuit opening 73h, and a lead 72c for connecting the terminal connector 72a and the first short-circuit unit 72b.

The terminal connector 72a is formed to be a square or rectangular plate, and it is inserted into the second groove 73b such that its top surface is exposed to the outside. The opening 72d into which the second terminal 22 is inserted is formed on the terminal connector 72a, and it is electrically connected to the second terminal 22 with the nut 29 as a medium. The second short-circuit unit 72b is generally semicircular, and it is within the short-circuit opening 73h and is exposed downward.

The cover plate 76 is formed to be a square or rectangular plate, and an opening 76a provided on the top of the vent member is formed in the center thereof. The cover plate 76 is formed to cover the leads 71c and 72c and the short-circuit units 71b and 72b of the first short-circuit tab 71 and the second short-circuit tab 72 so the terminal connectors 71a and 72a are exposed upward.

According to the present exemplary embodiment, the connecting member 70 can be formed through assembling, and the short-circuit tabs 71 and 72 connected to the short-circuit member 60 can be easily installed through a single connecting member 70.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
an electrode assembly comprising a first electrode and a second electrode;
a case housing the electrode assembly;
a cap plate coupled to the case;
a terminal electrically connected to the electrode assembly and protruding from the cap plate;

a connecting member on the cap plate, the connecting member including a body, a first short-circuit tab within the body and electrically connected to the first electrode, and a second short-circuit tab within the body and electrically connected to the second electrode; and a short-circuit member spaced from the first short-circuit tab and the second short-circuit tab.

2. The rechargeable battery of claim 1, wherein the short-circuit member is configured to electrically connect the first short-circuit tab and the second short-circuit tab when an internal pressure of the rechargeable battery increases to a predetermined pressure.

3. The rechargeable battery of claim 2, wherein the short-circuit member is within a short-circuit groove formed in the cap plate, wherein the short-circuit member has an edge and a curved portion extending generally toward the electrode assembly from the edge.

4. The rechargeable battery of claim 1, wherein the body is a plate and includes an opening configured to be generally aligned with a vent member.

5. The rechargeable battery of claim 1, wherein the body has a first groove exposing a surface of the first short-circuit tab and an opening into which the terminal is accommodated.

6. The rechargeable battery of claim 5, wherein the first short-circuit tab is electrically connected to the terminal by a nut on the terminal.

7. The rechargeable battery of claim 1, wherein the body has a short-circuit groove, wherein a first short-circuit unit in the short-circuit groove is on the first short-circuit tab, wherein a second short-circuit unit in the short-circuit groove is on the second short-circuit tab, and wherein the first short-circuit unit and the second short-circuit unit are separate from each other.

8. The rechargeable battery of claim 7, wherein a protrusion extending toward the cap plate is formed in the short-circuit groove, and a grooVe into which the protrusion is accommodated is formed on the cap plate.

9. The rechargeable battery of claim 1, wherein the body is molded so that the first short-circuit tab and the second short-circuit tab may be inserted therein.

10. The rechargeable battery of claim 1, wherein the body has a groove into which the first short-circuit tab and the second short-circuit tab are accommodated, and wherein a cover plate covers the first short-circuit tab and the second short-circuit tab.

11. The rechargeable battery of claim 1, wherein the first short-circuit tab includes a terminal connector having an opening into which a first terminal of the terminal is accommodated, a first short-circuit unit that is exposed to the body, and a lead connecting the terminal connector and the first short-circuit unit, and wherein the second short-circuit tab includes a terminal connector having an opening into which a second terminal of the terminal is accommodated, a second short-circuit unit that is exposed to the body, and a lead connecting the terminal connector and the second short-circuit unit.

12. The rechargeable battery of claim 11, wherein an insulating bar is between the first short-circuit unit and the second short-circuit unit.

13. The rechargeable battery of claim 1, wherein the connecting member has an area corresponding to an area of the cap plate.

* * * * *